A. L. BANKER.
TIRE CHAIN.
APPLICATION FILED JULY 7, 1919.

1,369,076.

Patented Feb. 22, 1921.
2 SHEETS—SHEET 1.

WITNESS
R A Balderson
H M Conine

INVENTOR.
Arthur L. Banker
By Bakewell, Byrnes & Parmelee
his Attys.

A. L. BANKER.
TIRE CHAIN.
APPLICATION FILED JULY 7, 1919.
1,369,076.
Patented Feb. 22, 1921.
2 SHEETS—SHEET 2.
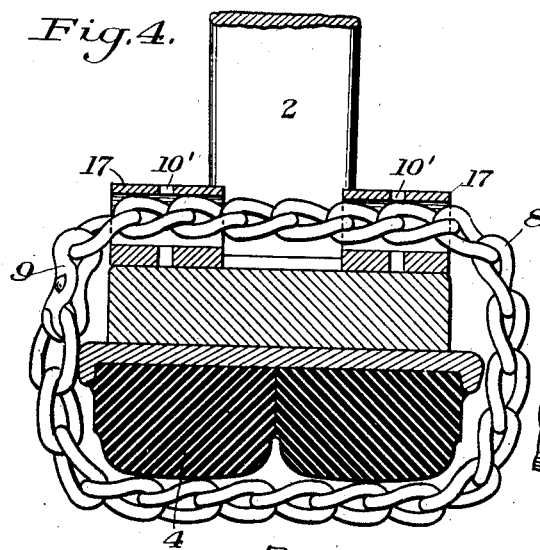
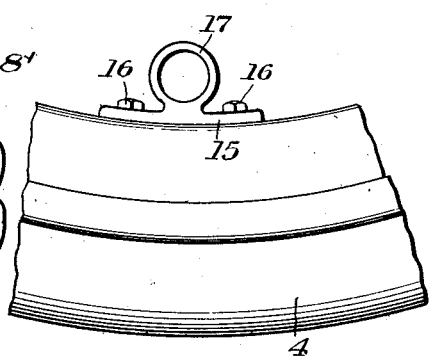
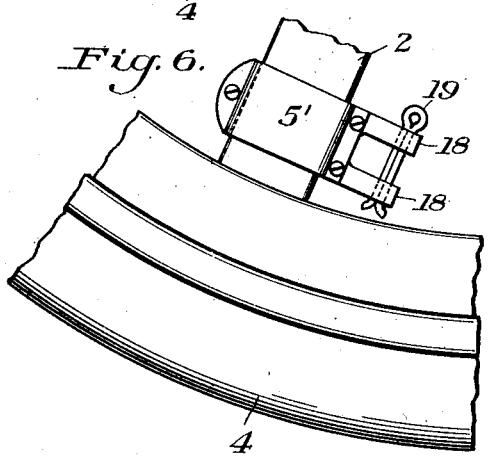
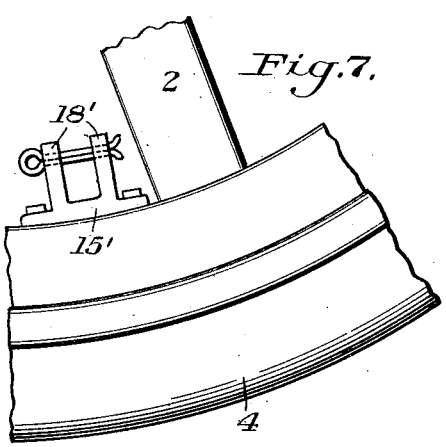
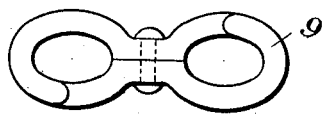
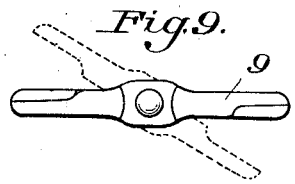
WITNESS
INVENTOR.
Arthur L. Banker
by Bakewell, Byrnes & Parmelee
his Attys.

UNITED STATES PATENT OFFICE.

ARTHUR L. BANKER, OF PITTSBURGH, PENNSYLVANIA.

TIRE-CHAIN.

1,369,076.  Specification of Letters Patent.  Patented Feb. 22, 1921.

Application filed July 7, 1919. Serial No. 308,938.

*To all whom it may concern:*

Be it known that I, ARTHUR L. BANKER, a citizen of the United States, residing at Pittsburgh, Allegheny county, Pennsylvania, have invented a new and useful Improvement in Tire-Chains, of which the following is a full, clear, and exact description, reference being had to the accompanying drawing, forming part of this specification.

The present invention relates broadly to anti-slipping devices for motor vehicles, and more particularly to a cross-chain adapted to be secured in position on a vehicle wheel at any desired point.

The principal object of the present invention is to provide an anti-slipping device of the character referred to which is so constructed that the wear during use is distributed evenly throughout the length thereof.

A further object of the present invention is to construct a tire chain adapted to creep or slip around the vehicle wheel during the travel of the same so that the wear is distributed, and having means for maintaining the chain in any desired position, if desirable.

The foregoing and other objects, together with their attendant advantages, will be apparent as the invention becomes better understood by reference to the accompanying specification and drawings forming a part thereof, it being premised that changes may be made in the details of construction illustrated within the scope of the appended claims, without departing from the spirit of the invention.

Fig. 4 is a view corresponding to Fig. 3 illustrating a modified form of my invention.

Fig. 5 is a side elevation of the modification illustrated in Fig. 4.

Figs. 6 and 7 are views corresponding to Fig. 5 illustrating a still further modification of the form of fastening means for the circulating tire chain, and Figs. 8 and 9 are detail views of a form of connecting link employed.

Figure 1:
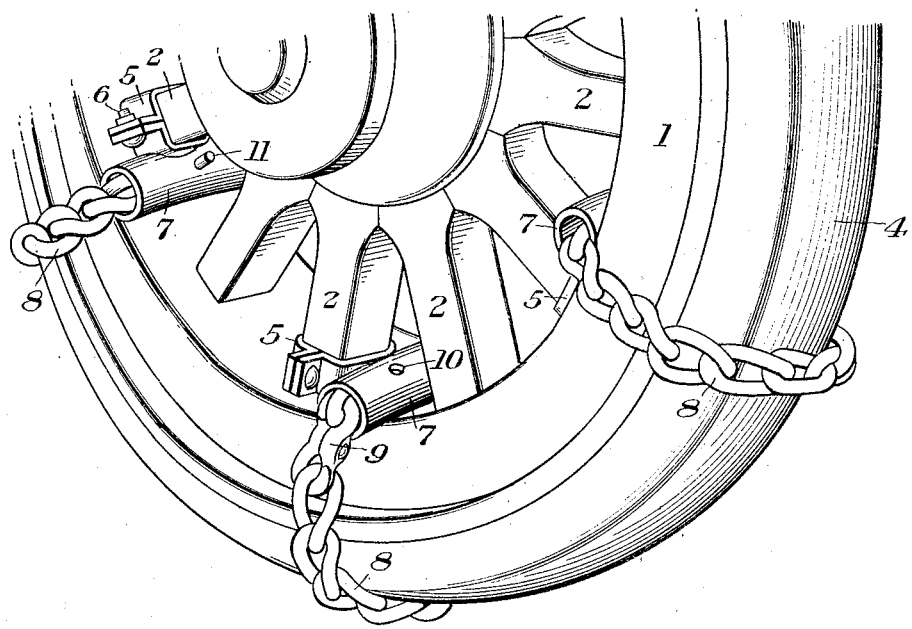
Figure 1 is a broken perspective view of a truck wheel showing one form of my improved tire chain in position thereon.
Figure 2:
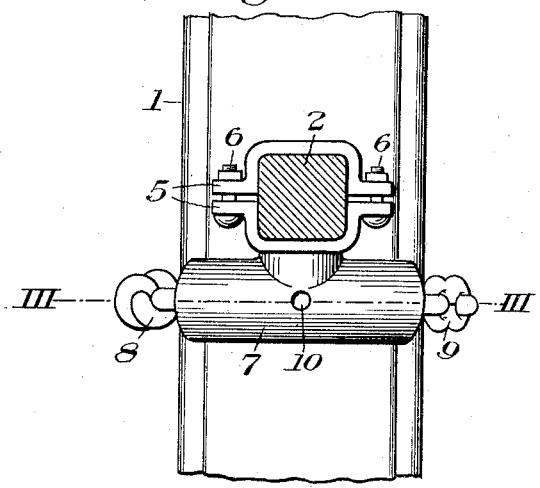
Fig. 2 is an enlarged detail view of a portion of a vehicle wheel showing one method of securing a circulating tire chain in position on a spoke.
Figure 3:
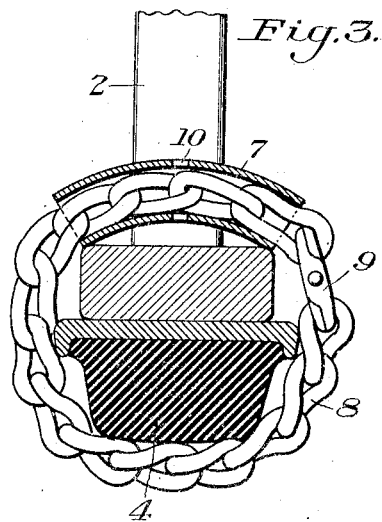
Fig. 3 is a cross-sectional view on the line III—III of Fig. 2, the chain being in elevation.

Referring more particularly to the drawings, I have illustrated a truck wheel 1 having the usual spokes 2. While the wheel may be provided with either a pneumatic or cushion tire 4, my improved form of tire chain is particularly adapted for use with cushion tires.

Adapted to be clamped around suitable spokes of the wheel are clamp members 5 having fastening bolts 6 extending therethrough. Formed integrally with, or suitably secured to one of the clamp members 5, is a curved tubular guide member 7 adapted when the device is in use to extend transversely between adjacent spokes of the wheel, as clearly illustrated in the drawings. Mounted in and extending through the tubular guide 7 and around the felly and tire of the wheel is an endless creeping chain 8 of any desired construction. In order that the chain may freely creep or slip through the tubular guide during the travel of the wheel so as to evenly distribute the wear throughout the length thereof, I preferably join the ends of the same by means of a double lap link 9 comprising pivotal sections as well understood.

In some instances, it is desirable to temporarily secure the creeping chain in a predetermined position and change this position from time to time as found desirable. For this purpose the tubular guide may be provided with suitable openings 10 adapted to receive a locking pin 11 which may be forced through the opening into engagement with any one of the links constituting the chain. With the pin in position, it will be understood that the chain is prevented from creeping through the tubular guide while the vehicle is in motion, so that the wear for certain periods of time is localized on the portion of the chain adjacent the tread of the tire.

While the construction just described is adaptable for use with either a single or double tread tire, I have found that the modified form of my invention, illustrated in Figs. 4 and 5, possesses advantages for use in connection with a double tread tire. In this form, my invention comprises a pair of plate members 15 adapted to be secured to the inner surface of the wheel felly by means of lag screws or the like 16. Each of the plate members is provided with a guide tube 17 projecting inwardly therefrom and adapted to receive the tire chain 8'. The plate members are preferably secured in position on the felly so that the guide members are in transverse alinement, permitting easy creeping of the chain. If found desirable each of the guides 17 may also be provided with locking pin holes 10' for the purpose hereinbefore described.

In still other cases I may desire to dispense with the guide tubes before described and provide clamp members 5' with projecting lugs 18 adapted to receive therebetween any one of the links of the chain for retaining the same in adjusted position for any desired length of time. The outer ends of the lugs 18 may be provided with an opening for the reception of a cotter pin 19 or other desired form of locking key.

Instead of securing the projecting lugs to one of the spokes by means of clamps, I may mount the same on a plate 15' similar to the plate before described, which plate carries inwardly projecting lugs 18'.

It will be apparent that with any of the forms of invention illustrated herein there is employed an endless anti-slipping chain, which chain may be permitted to freely creep or may be temporarily maintained in any adjusted position.

I am aware that it has heretofore been proposed to provide creeping tire chains for vehicle wheels, but in the constructions with which I am familiar the felly has either been provided with openings through which the anti-slipping chain is adapted to be threaded, or side chains are provided having links large enough to accommodate the passage of the cross chain. My present invention entirely eliminates the use of side chains so that the cost of the device is materially reduced and the application to standard wheel constructions is facilitated.

I claim:

1. In a device of the character described, an endless tire chain adapted to surround the wheel felly and tire carried thereby, said chain being adjustable therearound to bring different portions adjacent the tire tread, and means for locking the chain in adjusted position, substantially as described.

2. An anti-slipping device for vehicle wheels comprising an endless creeping tire chain adapted to surround the wheel felly and tire carried thereby, and means for temporarily locking said chain in any desired adjusted position, substantially as described.

3. An anti-slipping device for motor vehicle wheels, comprising a creeping cross chain adapted to entirely surround the wheel felly and tire carried thereby in a single loop, a detachable link for securing the ends of the chain together, and guide members coöperating therewith, substantially as described.

4. An anti-slipping device for vehicle wheels, comprising an endless tire chain, and a tubular guide member adapted to be detachably secured to the wheel body for receiving said chain, said tube having a diameter greater than the diameter of the chain to permit the chain to freely creep therethrough, substantially as described.

5. An anti-slipping device for vehicle wheels, comprising a clamp adapted to be secured to one of the spokes of the wheel, a tubular guide carried by said clamp, and an endless creeping tire chain mounted in said tubular guide, substantially as described.

6. An anti-slipping device for vehicle wheels, comprising a clamp adapted to be secured to one of the spokes of the wheel, a curved tubular guide carried by said clamp, and an endless creeping tire chain mounted in said tubular guide, substantially as described.

7. An anti-slipping device for vehicle wheels, comprising a clamp adapted to be secured to one of the spokes of the wheel, a tubular guide carried by said clamp, an endless creeping tire chain mounted in said tubular guide, and means carried by said guide for maintaining the chain in any desired position, substantially as described.

8. An anti-slipping device for vehicle wheels, comprising an endless creeping tire chain, and a tubular guide member adapted to be detachably secured to the wheel in the plane of the wheel for receiving said chain and permitting the same to creep therethrough, substantially as described.

9. An anti-slipping device for vehicle wheels, comprising means adapted to be detachably secured to a vehicle wheel, a guide carried thereby, and an endless tire chain adapted to surround the wheel felly and tire and creep through said guide, substantially as described.

10. An anti-slipping device for vehicle wheels, comprising means adapted to be detachably secured to a vehicle wheel, a tubular guide carried thereby, and an endless tire chain adapted to surround the wheel felly and tire and creep through said guide, substantially as described.

In testimony whereof, I have hereunto set my hand.

ARTHUR L. BANKER.